US012418523B2

(12) United States Patent
Ponnapalli

(10) Patent No.: US 12,418,523 B2
(45) Date of Patent: Sep. 16, 2025

(54) WEB APPLICATION LEVERAGING BIFURCATED SESSION AUTHENTICATION

(71) Applicant: Bank of America Corporation, Charlotte, NC (US)

(72) Inventor: Harigopal Kanaka Bapiraja Ponnapalli, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 18/438,753

(22) Filed: Feb. 12, 2024

(65) Prior Publication Data
US 2025/0260683 A1  Aug. 14, 2025

(51) Int. Cl.
*H04L 9/40* (2022.01)
*G06F 16/958* (2019.01)

(52) U.S. Cl.
CPC .......... *H04L 63/083* (2013.01); *G06F 16/986* (2019.01)

(58) Field of Classification Search
CPC ...... H04L 67/145; H04L 63/08; G06F 16/986
See application file for complete search history.

(56) References Cited

U.S. PATENT DOCUMENTS

| | | | |
|---|---|---|---|
| 8,824,664 B1* | 9/2014 | Ristock | H04L 63/08 379/266.03 |
| 2006/0075110 A1* | 4/2006 | Seraphin | H04L 63/08 709/227 |
| 2009/0094688 A1* | 4/2009 | Roy | H04L 67/02 726/7 |
| 2013/0024927 A1* | 1/2013 | Patil | G06F 21/305 726/9 |
| 2021/0099297 A1* | 4/2021 | Mane | H04L 9/3213 |
| 2022/0131854 A1* | 4/2022 | Joshi | G06Q 20/40 |

* cited by examiner

*Primary Examiner* — Hee Soo Kim
(74) *Attorney, Agent, or Firm* — Weiss & Arons LLP

(57) ABSTRACT

A system for providing enhanced web browser security that leverages a bifurcated web-based application authentication system. The system may include a web-based application configured to, after authentication of login information, generate a session cookie authentication information. The authentication information may match some or all of the data stored in the session cookie. The system may include a web browser configured to store the session cookie in a folder designated for storage of session cookies. The web browser may be further configured to add a new object to a DOM document hierarchy, the new object storing the authentication information. The web browser may be further configured to repeatedly push, to the web-based application, the authentication information upon the lapse of a time interval.

20 Claims, 4 Drawing Sheets

WEB APPLICATION LEVERAGING BIFURCATED SESSION AUTHENTICATION

FIELD OF TECHNOLOGY

Aspects of the disclosure relate to providing a bifurcated authentication system for a secure session run in a web browser.

BACKGROUND OF THE DISCLOSURE

Any critical business application today relies heavily on session management where an application session is created after a user is fully authenticated. Session cookies are a popular mechanism used by a web application to maintain a secure session that is accessed by a user after the user's authentication.

Session protection is a critical measure to ensure the overall security of the application and the user's data. However, multiple methods exist for an unsecured party to gain access to a secure session. For example, stealing cookies to initiate a session reply is a common tactic used to take over an account.

It would be desirable, therefore, to provide systems and methods to protect application session data from being misused to protect both the web-based application running the application session and the user accessing the secured session via a user web browser.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
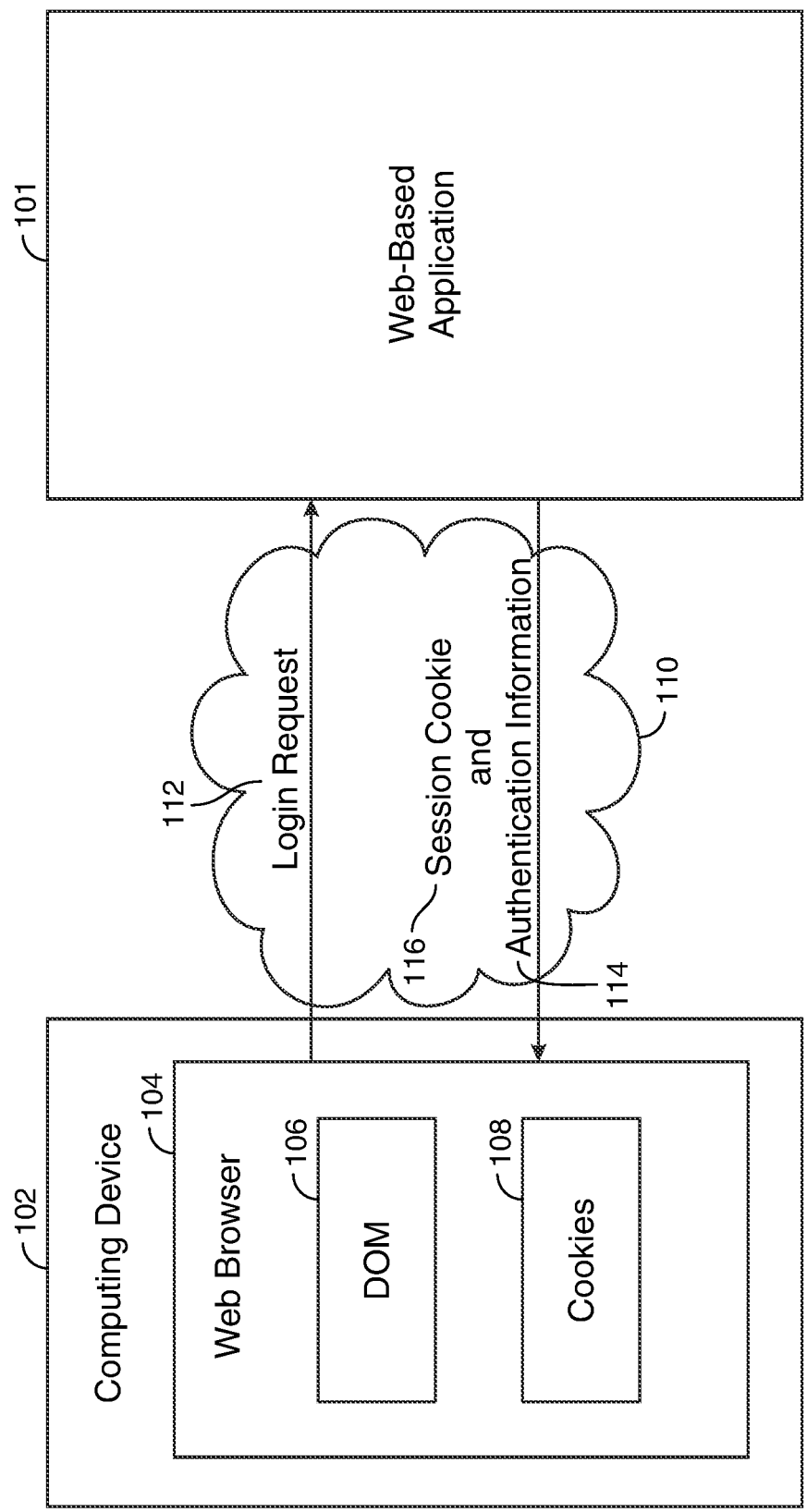
FIG. 1 shows illustrative apparatus and methods in accordance with principles of the disclosure.

Systems and methods for providing enhanced web browser security that leverages a bifurcated web-based application authentication system as provided. The system may include a web browser. The system may include a web-based application.

The web browser may run on a computing device. The web-based application may be hosted on the internet and run by a remote server. The web browser may be in electronic communication with the web-based application through an internet connection.

The web browser may create a website document object model ("DOM") for a web-based application. The DOM may be created based on HTML/CSS code received, by the web browser, from the web-based application. The DOM may be stored on the computing device. The DOM may be a JavaScript™ object. The DOM may be an internal data structure used by the web browser to load a visual interface—i.e. a website—for a user in response to receipt of HTML/CSS code from the web-based application. The DOM may store a plurality of objects in a DOM document hierarchy. Each HTML element received may be represented as an object in the document hierarchy.

In response to receipt of login information for accessing a secured session run by the web-based application, the web browser may transmit, to the web-based application, the login information. Exemplary login information may be a username, password, phone number, one-time personal identification number ("PIN"), or any other suitable login information.

For example, in illustrative embodiments, the login request may be a request to initiate a secured session within the web-based application. The secured session may be the video conference session. The login request may be any login request to access a secured website. Once the login request is accepted by the web-based application, the browser may run a secured session through the web-based application. The browser may run the secured session in response to secured session information received from the web-based application.

The web-based application may receive and authenticate the login information. After the authentication of the login information, the web-based application may generate a session cookie. The web-based application may also generate authentication information. The web-based application may store the session cookie and authentication information at a database. The authentication information may be associated with the session cookie. The web-based application may generate a data packet for transmission to the web browser. The data packet may include the session cookie and the authentication information.

The session cookie may be a text file. The text file may store information about a user of the computing device, a preferred language, browsing history, login information, or any other suitable information. In some embodiments, the web-based application may transmit to the web browser data that, when received by the web browser, is used by the web browser to create the session cookie.

The authentication information may match at least some of the data stored in the session cookie. In these embodiments, some of the authentication information may be stored in the session cookie. In some of these embodiments, some data included in the authentication information may not be included in the session cookie.

The authentication information may match all of the data stored in the session cookie. In these embodiments, all of the authentication information may be stored in the session cookie.

A portion of the data stored in the session cookie may not be included in the authentication information. For example, in some embodiments, the session cookie may be updated by the web browser to store user browser history as the user is interacting with the secured session. The authentication information, in contrast, may only include the data stored in the session cookie when it was initially generated by the web-based application. The authentication information, therefore, may not be updated to include user browser behavior.

In some embodiments, one or both of the session cookie and the authentication information may include an access token. The access token may be generated by the web-based application after authentication of the login information.

The web browser may receive, from the web-based application, the data packet. The data packet may store the session cookie and the authentication information. In response to receipt of the data packet, the web browser may store the session cookie in a folder designated for storage of session cookies. The web browser may also add a new object to the DOM document hierarchy. The new object may store the authentication information. In response to receipt of the data packet, the web browser may provide the user with access to the secured session.

Some or all of the HTML elements of the web-based application may be represented as an object in the DOM document hierarchy. The objects may be arranged as branches of a tree. Each branch may end in one or more nodes. The new object may be a new branch to the DOM document hierarchy. The new object may be added to an existing branch of the DOM document hierarchy.

During the running of the secured session, the web-based application may transmit the session cookie to the web browser together with each request received by the web browser in connection with the secured session. During the running of the secured session, the web-based application may also repeatedly push the authentication information to the web browser upon the lapse of a time interval. The time interval may be, greater than, equal to or less than, 1 second, 3 seconds, 5 seconds, 10 seconds, 20 seconds, 30 seconds, 1 minute, 2 minutes, or any other suitable time interval.

The web browser may authenticate the session cookie each time the session cookie is received from the web-based application. Upon receipt of pushed authentication information, the web browser may determine if the pushed authentication information matches the authentication information stored by the web browser and associated with the secured session. The web browser may also repeatedly determine if the pushed authentication information is received upon the recurrent lapse of the time interval. The pushed authentication information may be authentication information received by the web browser from the web-based application.

The web browser, in response to receipt of a log-out request, may delete the session cookie from the folder. The web browser, in response to receipt of a log-out request, may also delete the authentication information from the DOM.

The web-based application may terminate the secured session in response to a determination that the pushed authentication information was not received upon a lapse of the predetermined time period.

The web-based application may terminate the secured session in response to a determination that the session cookie was received and authenticated and, also, the pushed authentication information does not match the authentication information stored by the web browser.

The web-based application may terminate the secured session in response to a determination that the pushed authentication information matches the authentication information stored by the web browser and a session cookie received with a new user request is different from the stored session cookie.

The web-based application may terminate the secured session by deleting the session cookie and/or the authentication information from the database in which the session cookie was stored.

The web browser, in response to a termination of the secured session by the web-based application, may delete the session cookie from the folder and delete the authentication information from the DOM.

In response to receipt of a session cookie attempting to restart the secured session, the web-based application may wait for receipt of the authentication information. In the event that the authentication information is not received, the web-based application may deny the request to restart, replay or provide access to the secured session. This is desirable at least because the authentication information provides a second layer of security so that even if a hacker gains access to the session cookie, it is not enough for the hacker to gain access to the secured session because the hacker does not have the authentication information.

In some embodiments, the web browser may add a random string to a URL of a webpage hosting the secured session during the running of the secured session. The web browser may save the random string on the computing device but not in the folder designated for storage of session cookies. The web browser may trigger the expiry of the random string when the secured session is terminated. This may ensure that an unauthorized session replay of the secured session is not possible.

Systems and methods of the invention may include methods for providing the web browser described herein. The web browser may include have the enhanced security features leveraging the bifurcated web-based application authentication system. The web browser may be run on a computing device. The web browser may perform the methods described herein.

Systems and methods of the invention may include methods for providing the web-based application described herein. The web-based application may be hosted on a remote server. The web-based application may perform the methods described herein.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative system architecture in accordance with principles of the disclosure. The illustrative system architecture may include web-based application 101. The illustrative system architecture may include computing device 102. Web-based application 101 may be in electronic communication with computing device 102 via internet 110. Web-based application 101 may be in electronic communication with web browser 104 via internet 110.

Web browser 104 may include cookies 108. Cookies 108 may be a folder for storing cookies. Web browser 104 may include DOM 106.

Web browser 104 may transmit login request 112 to web-based application 101. Login request 112 may be a request received by web browser 104 from a user. Web-based application 101, in response to receipt of login request 112, may generate and transmit to web browser 104 both session cookie 116 and authentication information 114.

Figure 2:
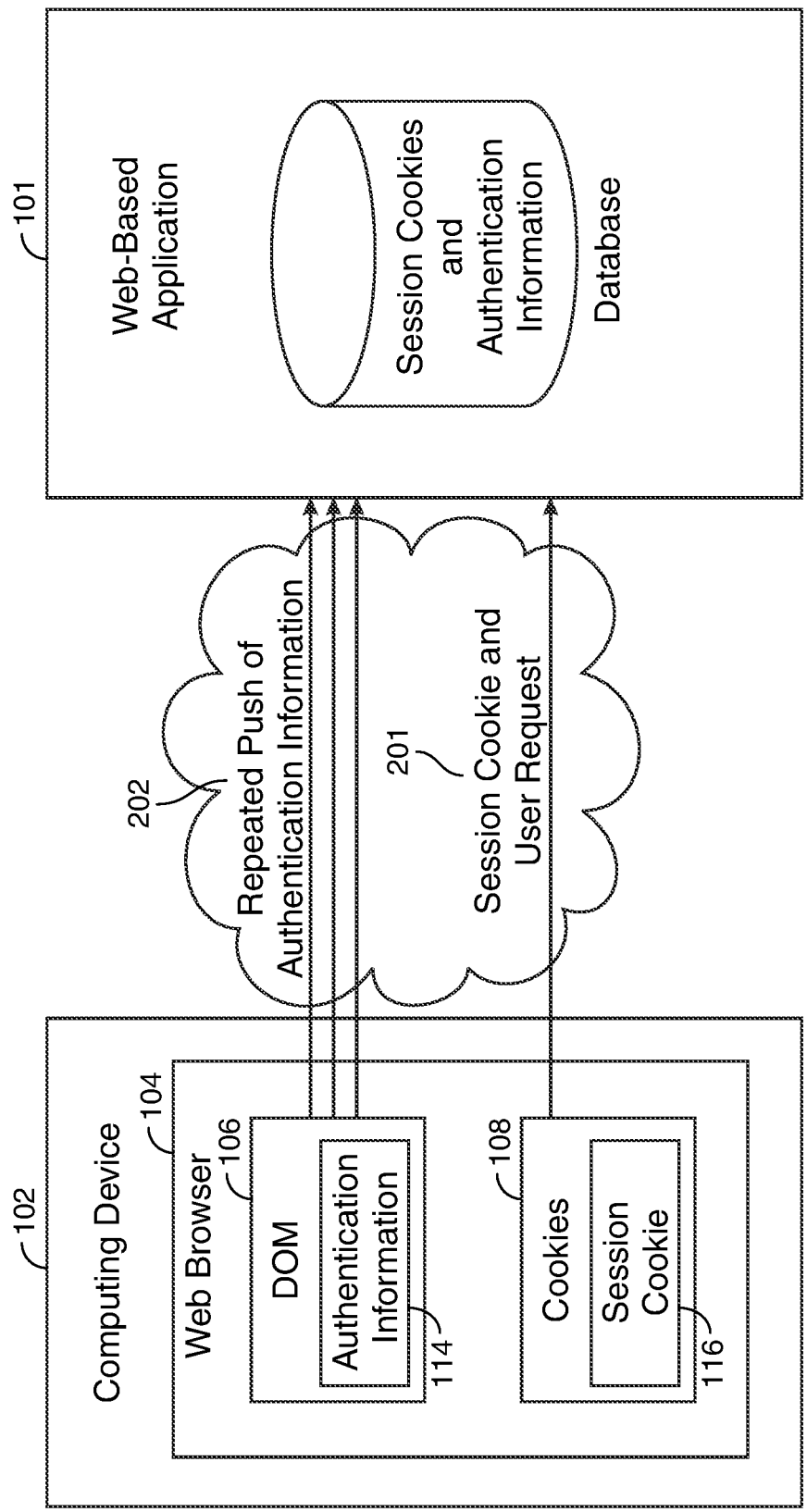
FIG. 2 shows illustrative apparatus and methods in accordance with principles of the disclosure.

FIG. 2 shows illustrative system architecture in accordance with principles of the disclosure. The illustrative system architecture includes apparatus illustrated in FIG. 1. In FIG. 2, web browser 104 is illustrated as storing authentication information 112 in DOM 106 and session cookie 116 in cookies 108. In FIG. 2, web-based application 101 is illustrated as storing session cookies and authentication information in a database. The session cookies may include session cookie 116. The authentication information may include authentication information 114.

Web browser 104 may transmit data 201 to web-based application 101. Data 201 may be session cookie 116 together with user request 201 received by web browser 104. Web browser 104 may also transmit data 202 to web browser 104. Data 202 may be repeatedly pushed to web-browser 101. Data 202 may be pushed upon the lapse of the time period. Data 202 may include authentication information 114. Data 202 may be pushed to web-browser 101 independent from whether or not a user request was received by web browser 104.

Figure 3:
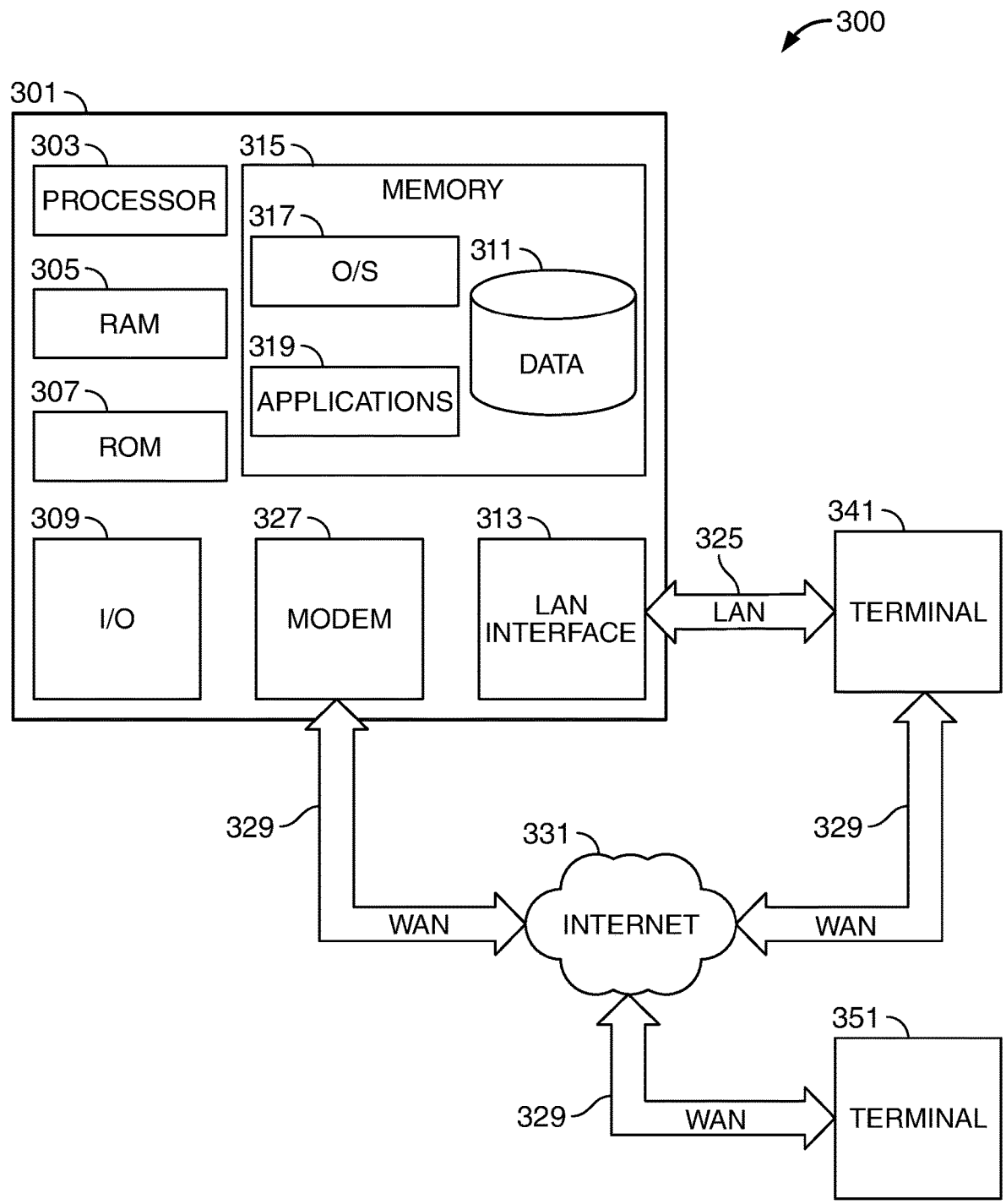
FIG. 3 shows an illustrative block diagram in accordance with principles of the disclosure.

FIG. 3 shows an illustrative block diagram of system 300 that includes computer 301. Computer 301 may alternatively be referred to herein as an "engine," "server" or a "computing device." The computing system may include one or more computer servers. Computer 301 may be any computing device described herein, such as the computing device coupled to the EIEAC, the EIEAC and/or the remote emulator. Elements of system 300, including computer 301, may be used to implement various aspects of the systems and methods disclosed herein.

Computer 301 may have a processor 303 for controlling the operation of the device and its associated components, and may include RAM 305, ROM 307, input/output circuit 309, and a non-transitory or non-volatile memory 315. Machine-readable memory may be configured to store information in machine-readable data structures. Other components commonly used for computers, such as EEPROM or Flash memory or any other suitable components, may also be part of the computer 301.

Memory 315 may be comprised of any suitable permanent storage technology—e.g., a hard drive. Memory 315 may store software including the operating system 317 and application(s) 319 along with any data 311 needed for the operation of computer 301. Memory 315 may also store videos, text, and/or audio assistance files. The data stored in Memory 315 may also be stored in cache memory, or any other suitable memory. Memory 315 may be memory within web-based application and/or memory within the web browser.

Input/output ("I/O") module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality.

Computer 301 may be connected to other systems via a local area network (LAN) interface 313. Computer 301 may operate in a networked environment supporting connections to one or more remote computers, such as terminals 341 and 351. Terminals 341 and 351 may be personal computers or servers that include many or all of the elements described above relative to computer 301.

When used in a LAN networking environment, computer 301 is connected to LAN 325 through a LAN interface 313 or an adapter. When used in a WAN networking environment, computer 301 may include a modem 327 or other means for establishing communications over WAN 329, such as Internet 331.

In some embodiments, computer 301 may be connected to one or more other systems via a short-range communication network (not shown). In these embodiments, computer 301 may communicate with one or more other terminals 341 and 351, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server, such as the web-based application, may transmit data to any other suitable computer system. The web-based server may also send computer-readable instructions, together with the data, to any suitable computer system or IoT device, such as the web browser. The computer-readable instructions may be to store the data in cache memory, the hard drive, secondary memory, or any other suitable memory.

Additionally, application program(s) 319, which may be used by computer 301, may include computer executable instructions for invoking functionality related to communication, such as e-mail, Short Message Service (SMS), and voice input and speech recognition applications. Application program(s) 319 (which may be alternatively referred to herein as "plugins," "applications," or "apps") may include computer executable instructions for invoking functionality related to performing various tasks. Application programs 319 may utilize one or more algorithms that process received executable instructions, perform power management routines or other suitable tasks. Application programs 319 may include any one or more of the applications, instructions and algorithms associated with the web-based application and/or the web browser described herein.

Application program(s) 319 may include computer executable instructions (alternatively referred to as "programs"). The computer executable instructions may be embodied in hardware or firmware (not shown). Computer 301 may execute the instructions embodied by the application program(s) 319 to perform various functions.

Application program(s) 319 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 319 may include one or more algorithms that may be used to implement features of the disclosure.

The invention may be described in the context of computer-executable instructions, such as applications 319, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 351 and/or terminal 341 may be portable devices such as a laptop, cell phone, Blackberry™, tablet, smartphone, or any other computing system for receiving, storing, transmitting and/or displaying relevant information. Terminal 351 and/or terminal 341 may be one or more computing devices. In illustrative embodiments, computer 301 may represent the web browser, terminal 351 may represent a first web-based application and terminal 341 may represent a second web-based application. Terminals 351 and 341 may be identical to computer 301 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 4:
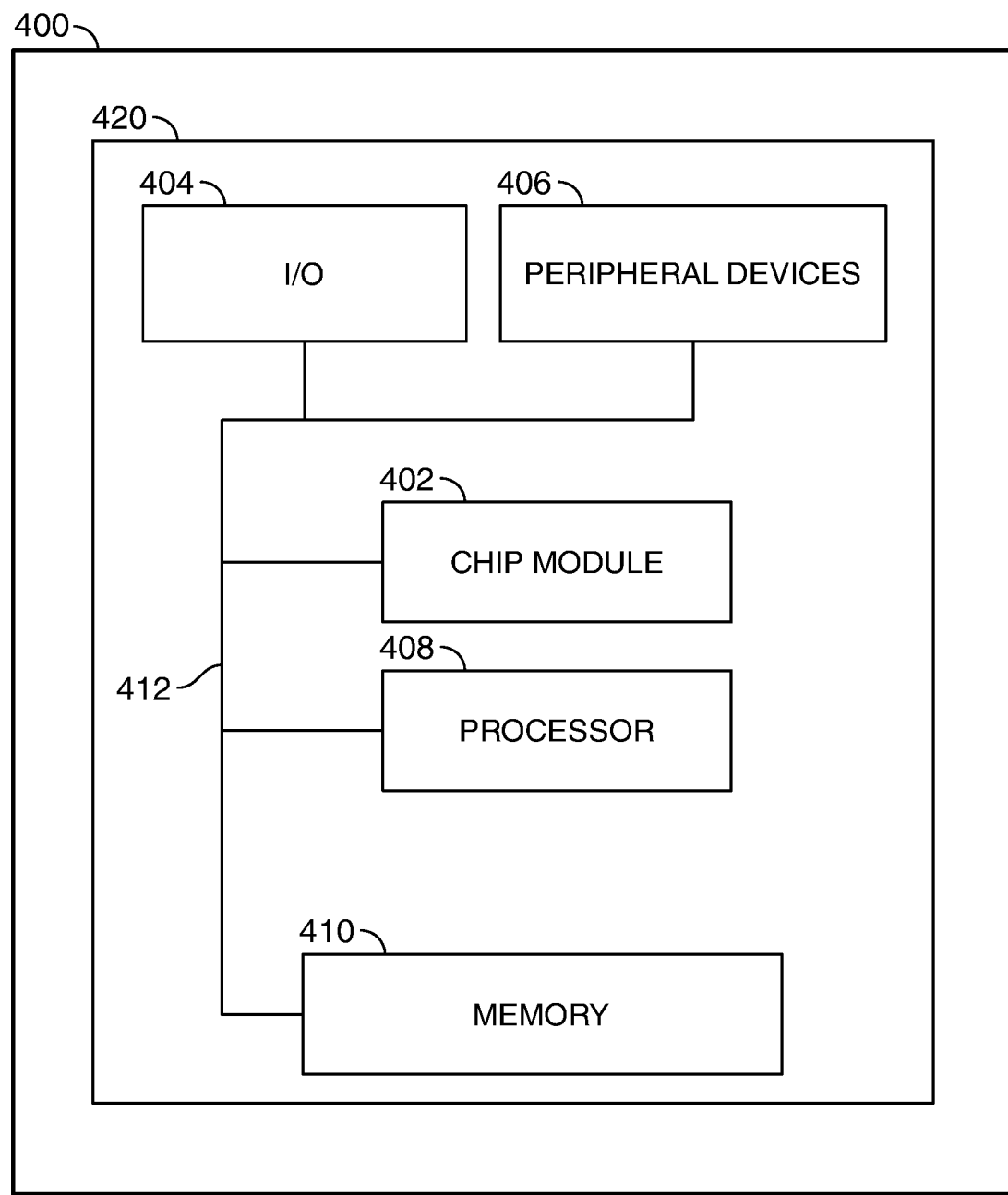
FIG. 4 shows an illustrative apparatus that may be configured in accordance with principles of the disclosure.

FIG. 4 shows illustrative apparatus 400 that may be configured in accordance with the principles of the disclosure. Apparatus 400 may be a computing device such as computer 301. Computer 301 may include some or all of the components of apparatus 400.

Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions, (which may be alternatively referred to herein as "computer instructions" or "computer code"), applications such as applications 119, signals, and/or any other suitable information or data structures.

Components 402, 404, 406, 408 and 410 may be coupled together by a system bus or other interconnections 412 and may be present on one or more circuit boards such as circuit board 420. In some embodiments, the components may be integrated into a single chip. The chip may be silicon-based.

Thus, systems and methods for providing enhanced web browser security are provided. Persons skilled in the art will appreciate that the present invention can be practiced by other than the described embodiments, which are presented for purposes of illustration rather than of limitation.

What is claimed is:

1. A system for providing enhanced web browser security that leverages a bifurcated web-based application authentication system, the system comprising:
   a web browser running on a computing device, the web browser being configured to:
      create a website document object model ("DOM") for a web-based application, the DOM storing a plurality of objects in a DOM document hierarchy;
      in response to receipt of login information for accessing a secured session run by the web-based application, transmitting, to the web-based application, the login information;
   the web-based application configured to:
      receive and authenticate the login information;
      after the authentication of the login information, generate:
         a session cookie; and
         authentication information, the authentication information matching at least some data stored in the session cookie; and
      store the session cookie and authentication information, wherein the stored authentication information is associated with the session cookie;
   the web browser being further configured to:
      receive, from the web-based application, a data packet, the data packet storing the session cookie and the authentication information;
      in response to receipt of the data packet:
         store the session cookie in a folder designated for storage of session cookies; and
         add a new object to the DOM document hierarchy, the new object storing the authentication information; and
         provide access to the secured session;
      during the running of the secured session:
         transmit the cookie to the web-based application together with each request received by the web browser in connection with the secured session; and repeatedly push the authentication information to the web-based application upon the lapse of a time interval;

the web browser being further configured to:
authenticate the session cookie each time the session cookie is received from the web browser; and
upon receipt of pushed authentication information, determine if:
the pushed authentication information matches the authentication information stored by the web browser and associated with the secured session; and
the pushed authentication information is being received repeatedly upon the lapse of the time interval.

2. The system of claim 1 wherein the web browser, in response to receipt of a log-out request, is further configured to:
delete the session cookie from the folder; and
delete the authentication information from the DOM.

3. The system of claim 1 wherein the authentication information matches all of the data stored in the session cookie.

4. The system of claim 1 wherein a portion of the data stored in the session cookie is not included in the authentication information.

5. The system of claim 1 wherein both the session cookie and the authentication information include an access token, wherein the access token is generated by the web-based application after authentication of the login information.

6. The system of claim 1 wherein the time interval is less than 30 seconds.

7. The system of claim 1 wherein the web-based application is further configured to terminate the secured session in response to a determination that:
the pushed authentication information was not received upon a lapse of a predetermined time period.

8. The system of claim 1 wherein the web-based application is further configured to terminate the secured session in response to a determination that:
the session cookie was received and authenticated; and
the pushed authentication information does not match the authentication information stored by the web browser.

9. The system of claim 1 wherein the web-based application is further configured to terminate the secured session in response to a determination that:
the pushed authentication information matches the authentication information stored by the web browser; and
a session cookie received with a new user request is different from the stored session cookie.

10. The system of claim 1 wherein:
every HTML element of the web-based application is represented as an object in the DOM document hierarchy, the objects being arranged as branches of a tree, each branch ending in one or more nodes; and
the adding the new object comprises adding a new branch to the DOM document hierarchy.

11. The system of claim 1 wherein:
every HTML element of the web-based application is represented as an object in the DOM document hierarchy, the objects being arranged as branches of a tree, each branch ending in one or more nodes; and
the adding the new object comprises adding a new node to an existing branch of the DOM document hierarchy.

12. The system of claim 1 wherein the web browser is further configured to:
add a random string to a URL of a webpage hosting the secured session; and
saving the random string on the computing device but not in the folder designated for storage of session cookies.

13. The system of claim 12 wherein the web browser is further configured to trigger the expiry of the random string at a termination of the secured session, ensuring that an unauthorized session replay of the secured session is not possible.

14. A method for providing a web browser having enhanced security features that leverage a bifurcated web-based application authentication system, the web browser being run on a computing device, the method comprising:
creating a website document object model ("DOM") for a web-based application, the DOM storing a plurality of objects in a DOM document hierarchy;
in response to receipt of login information for accessing a secured session run by the web-based application, transmitting, to the web-based application, the login information;
receiving, from the web-based application, a data packet storing a session cookie and authentication information stored separately from the session cookie, the authentication information storing data that is also stored in the session cookie;
in response to receipt of the data packet:
storing the session cookie in a folder designated for storage of session cookies; and
adding a new object to the DOM document hierarchy, the new object storing the authentication information; and
providing access to the secured session;
during the running of the secured session:
transmitting the cookie to the web-based application together with each request received by the web browser in connection with the secured session; and
repeatedly pushing the authentication information to the web-based application upon the lapse of a time interval;
in response to receipt of a log-out request:
deleting the session cookie from the folder; and
deleting the authentication information from the DOM.

15. The method of claim 14 wherein the authentication information matches all of the data stored in the session cookie.

16. The method of claim 14 wherein both the session cookie and the authentication information include an access token, wherein the access token is generated by the web-based application after authentication of the login information.

17. The method of claim 14 wherein the time interval is less than 30 seconds.

18. A system for providing enhanced web browser security that leverages a bifurcated web-based application authentication system, the system comprising:
the web browser being run on a computing device and configured to:
create a website document object model ("DOM") for a web-based application, the DOM storing a plurality of objects in a DOM document hierarchy;
in response to receipt of login information for accessing a secured session run by the web-based application, transmitting, to the web-based application, the login information;
the web-based application configured to:
receive and authenticate the login information;

after the authentication of the login information, generate:
   a session cookie; and
   authentication information, the authentication information matching data stored in the session cookie; and
store the session cookie and authentication information, wherein the stored authentication information is associated with the session cookie;
the web browser being further configured to:
   receive, from the web-based application, a data packet, the data packet storing the session cookie and the authentication information;
   in response to receipt of the data packet:
      store the session cookie in a folder designated for storage of session cookies; and
      add a new object to the DOM document hierarchy, the new object storing the authentication information; and
      provide access to the secured session;
   during the running of the secured session:
      transmit the cookie to the web-based application together with each request received by the web browser in connection with the secured session; and
      repeatedly push the authentication information to the web-based application upon the lapse of a time interval, the time interval being less than 30 seconds;
the web browser being further configured to:
   authenticate the session cookie each time the session cookie is received from the web browser; and
   upon receipt of pushed authentication information, determine if:
      the pushed authentication information matches the authentication information stored by the web browser and associated with the secured session; and
      the pushed authentication information is being received repeatedly upon the lapse of the time interval; and
   terminating the secured session in response to a determination that:
      the session cookie was received; and
      the pushed authentication information does not match the authentication information stored by the web browser.

19. The system of claim 18 wherein the web browser, in response to a termination of the secured session, is further configured to:
   delete the session cookie from the folder; and
   delete the authentication information from the DOM.

20. The system of claim 18 wherein the authentication information matches all of the data stored in the session cookie.

* * * * *